Jan. 31, 1961 W. L. PETERSEN 2,969,557
POWERED FLOOR SCRUBBER
Filed Nov. 30, 1956 6 Sheets-Sheet 3
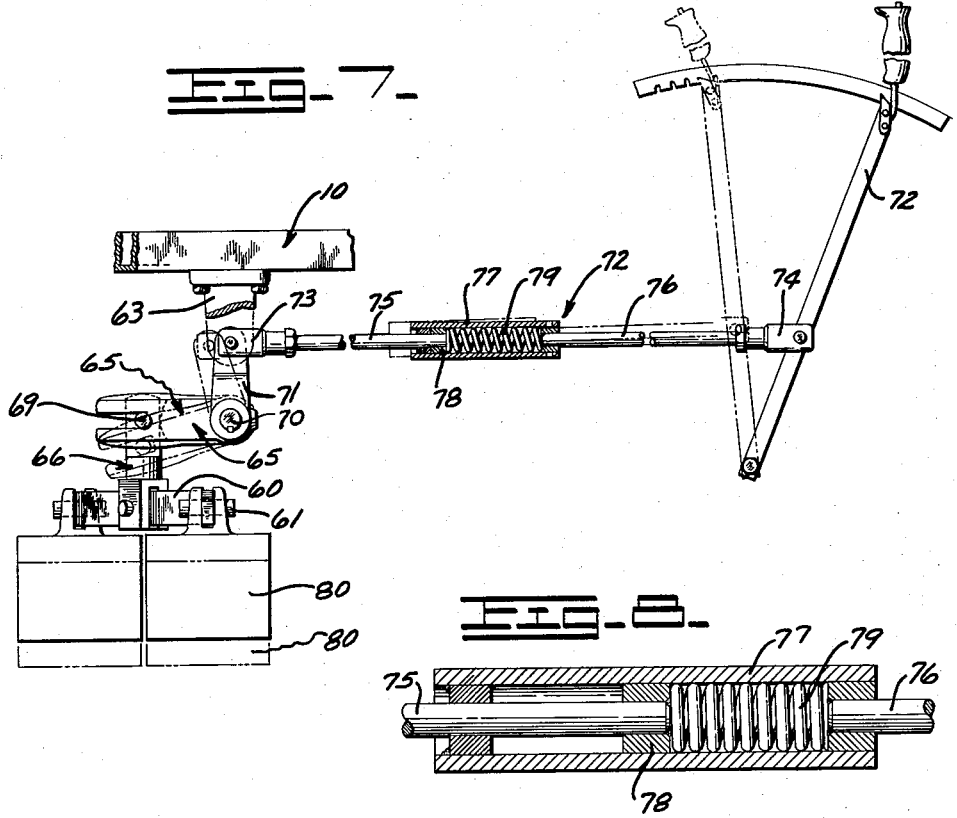
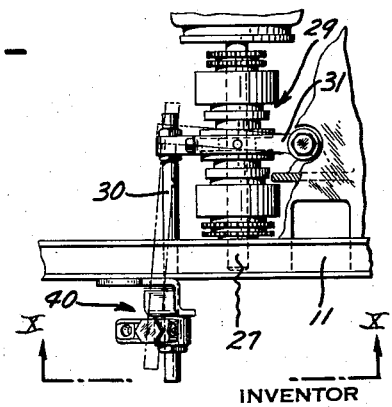
INVENTOR
WILLIAM L. PETERSEN
BY
ATTORNEYS

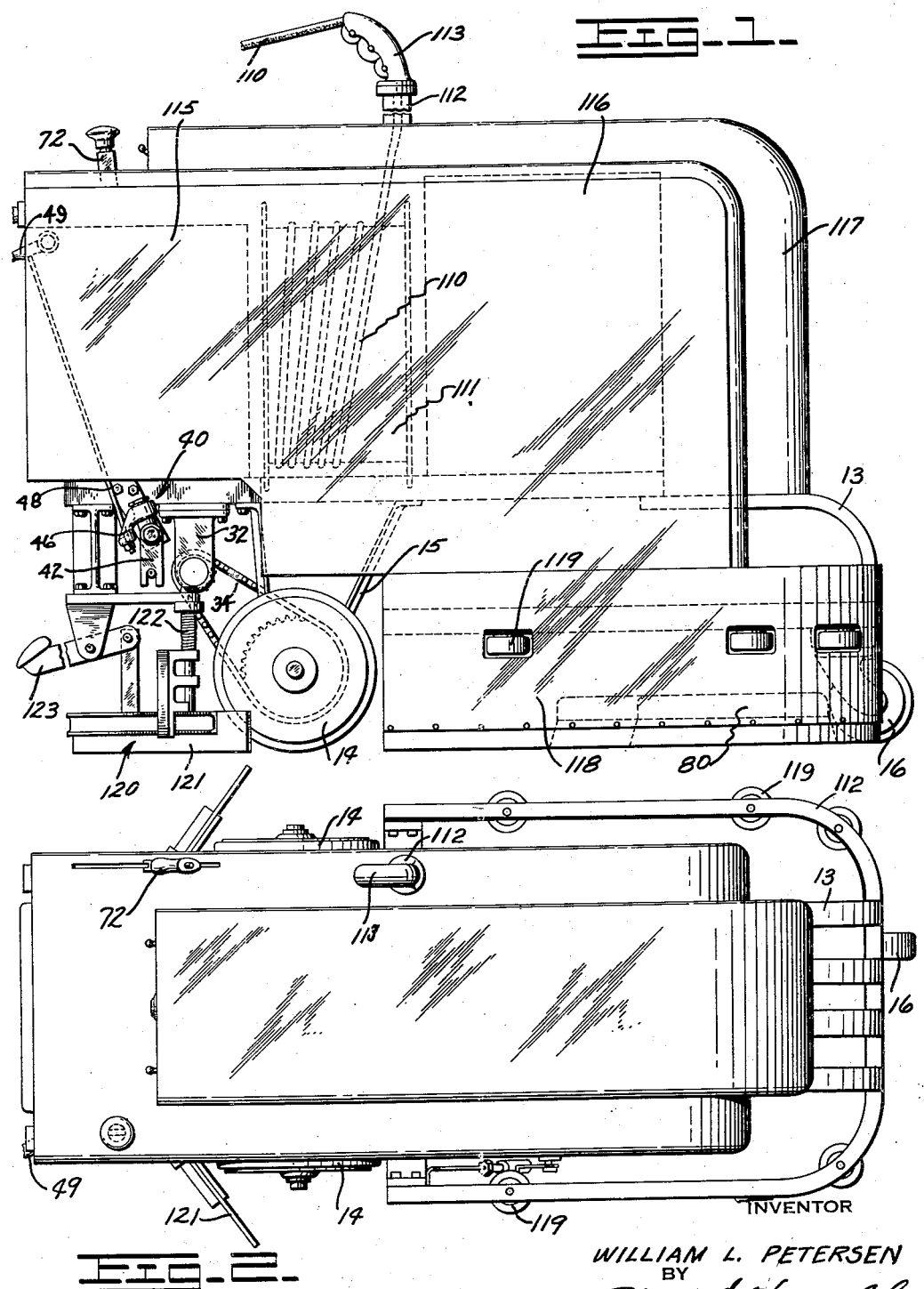

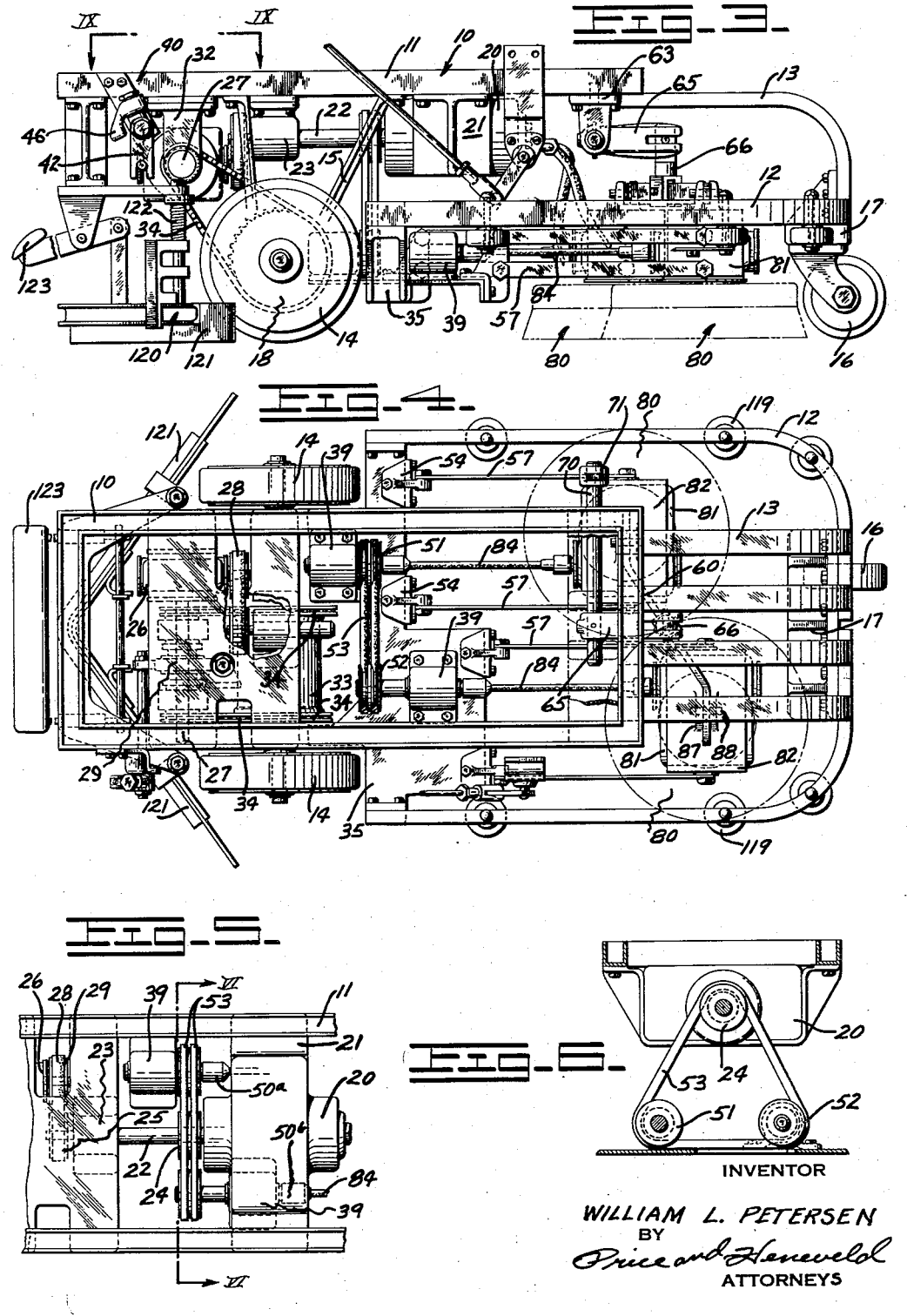

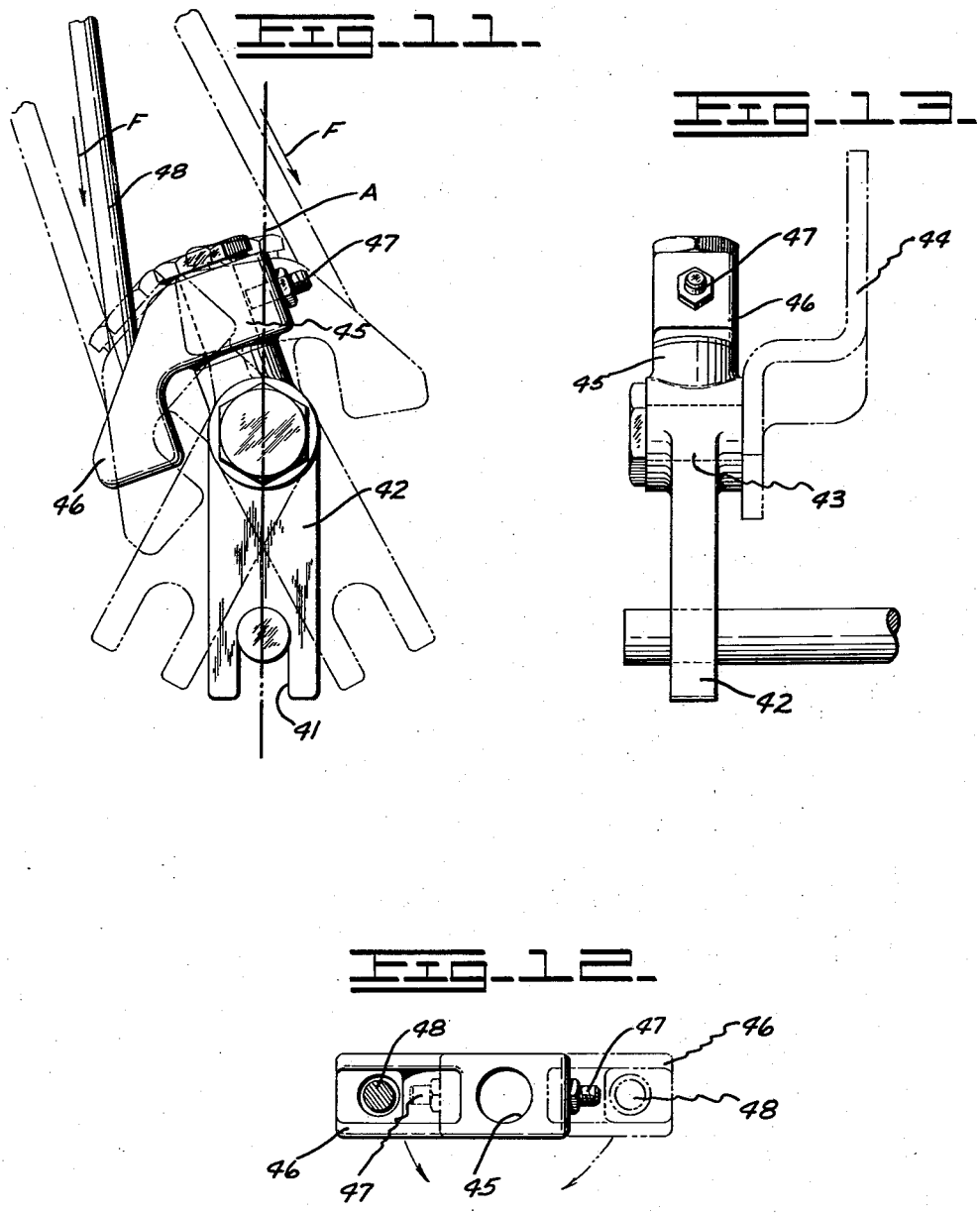

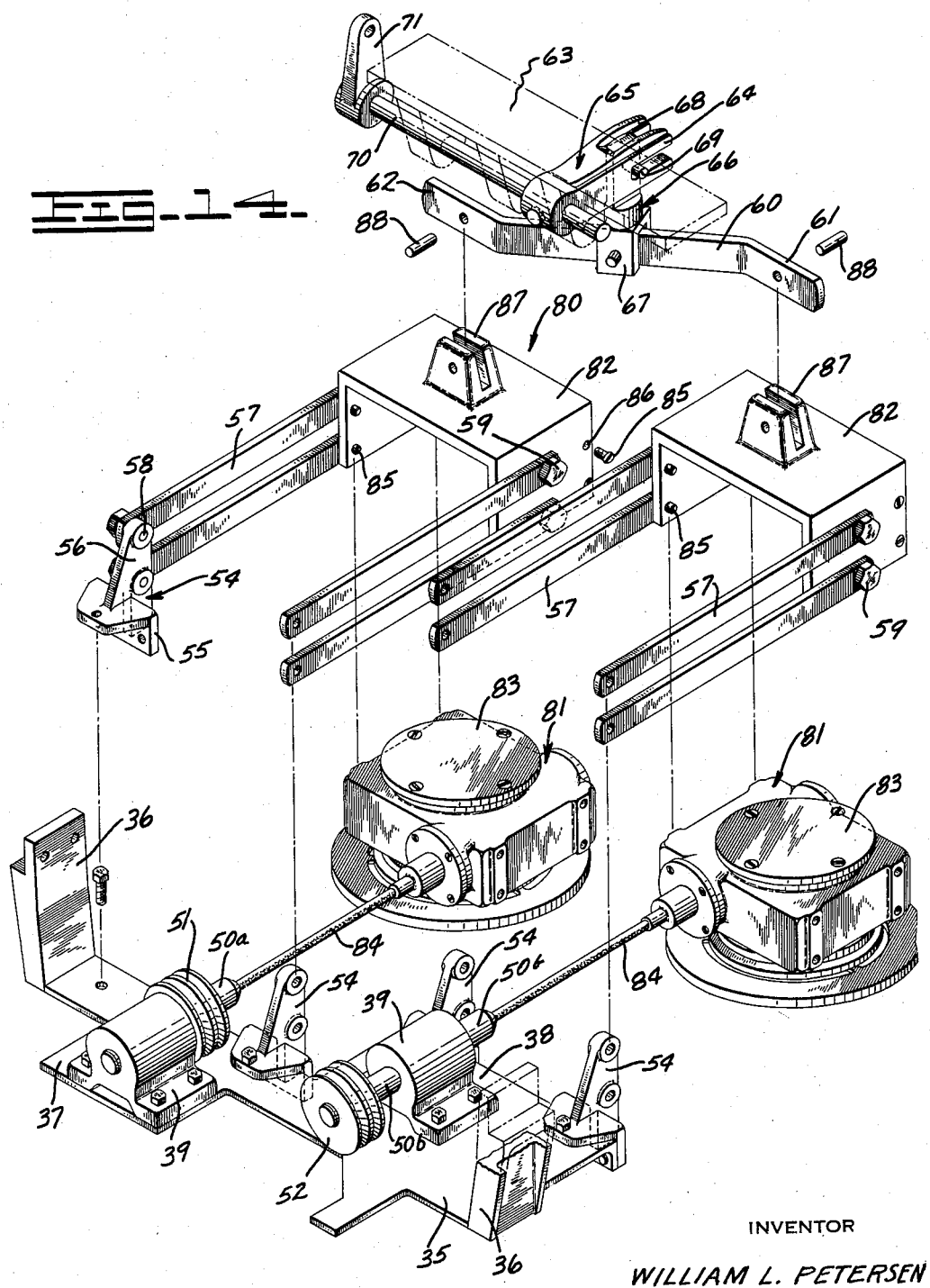

Jan. 31, 1961  W. L. PETERSEN  2,969,557
POWERED FLOOR SCRUBBER
Filed Nov. 30, 1956  6 Sheets-Sheet 6
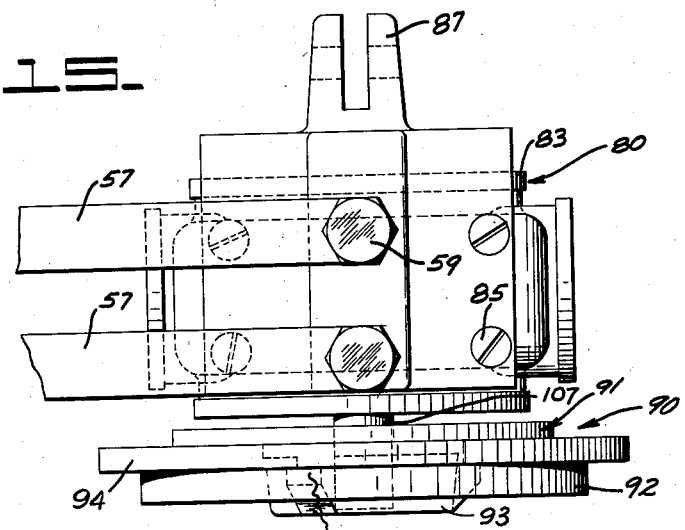
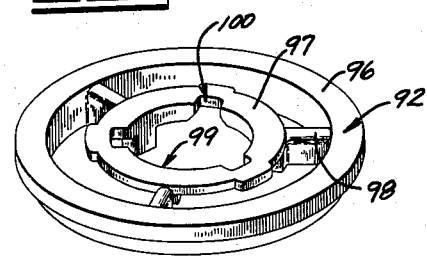
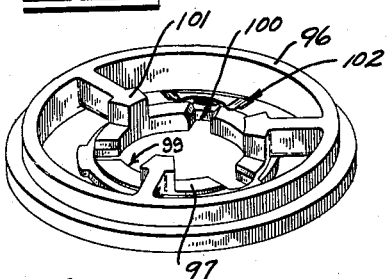
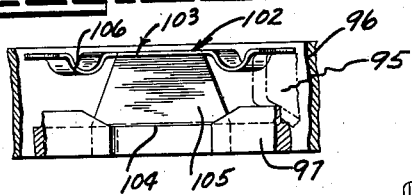
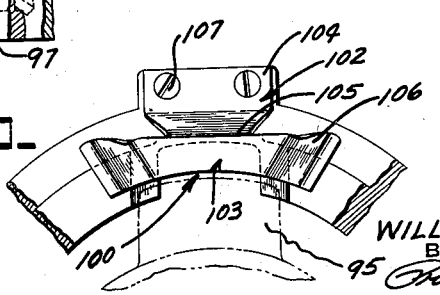
INVENTOR
WILLIAM L. PETERSEN
BY
ATTORNEYS

United States Patent Office 2,969,557
Patented Jan. 31, 1961

2,969,557

POWERED FLOOR SCRUBBER

William L. Petersen, Muskegon, Mich., assignor to Clarke Floor Machine Company, a corporation of Michigan Filed Nov. 30, 1956, Ser. No. 625,372

6 Claims. (Cl. 15—50)

This invention relates to powered floor scrubbing machines such as those used for cleaning floors, decks, platforms, sidewalks and similar locations.

Floor scrubbing machines of this type are generally not new. However, present-day floor scrubbers are not completely satisfactory either as to their performance or the ease in handling and manipulating them. Therefore, one object of this invention is to provide a novel floor scrubber having better overall performance and ease of operation.

A further object of this invention is to provide a floor scrubber having a novel frame arrangement for supporting the brushes and drive wheels, both of which are driven by a single prime mover.

Still another object of this invention is to provide a floor scrubber having a novel mechanism for mounting the brushes so that they are always parallel to the floor regardless of the floor inclination or irregularities.

A further object of this invention is to devise a floor scrubbing machine having incorporated in it a novel means for applying any degree of pressure on the brushes.

Another object of this invention is to provide a floor scrubber, the brush position of which is positively controlled by the longitudinal attitude of the machine relative to the floor.

A further object of this invention is to provide a novel mounting for the brushes which will dip or rise to accommodate floor surface irregularities.

A further object of this invention is to devise a novel mechanism in a floor scrubber for easily exerting position pressure on the brushes without any possible binding.

Still another object of this invention is to provide a floor scrubbing machine having a novel detachable means for the brush support plate. This means eliminates chatter and resultant wear usually encountered in other type machines.

Another object of this invention is to devise an actuating mechanism for the clutch of the machine, such mechanism permitting actuation of the clutch to either of two positions by the same force applied in the same direction.

Still another object of this invention is to provide an actuating mechanism for rotating an actuator lever to either side of neutral by the same force applied in the same direction.

These and other objects of my invention will become more evident in the following specification made in conjunction with the accompanying drawings wherein:

Fig. 1 is a side, elevational view of the floor scrubbing machine.

Fig. 2 is a plan view of the scrubbing machine.

Fig. 3 is a side, elevational view of the interior mechanism of the machine.

Fig. 4 is a plan view of the machine with the cover off and illustrating the mechanism of the machine.

Fig. 5 is a plan view of the prime mover mechanism.

Fig. 6 is a cross-sectional view taken along the plane VI—VI of Fig. 5.

Fig. 7 is a side, elevational view of the mechanism for applying pressure to the brushes.

Fig. 8 is an enlarged, fragmentary, sectional view of the compressible linkage means of the actuating rod of Fig. 7.

Fig. 9 is a plan view of the clutch mechanism and the clutch actuating mechanism, viewing such mechanism from the direction indicated at IX—IX of Fig. 3.

Fig. 10 is a side elevational cross-sectional view of Fig. 9 viewing such mechanism from a direction indicated by X—X of Fig. 9.

Fig. 11 is a side, elevational view of the clutch actuating mechanism illustrating the principle thereof.

Fig. 12 is a cross-sectional view taken along the plane XII—XII of Fig. 10.

Fig. 13 is a front, elevational view of the clutch actuator arm and lever.

Fig. 14 is an oblique, exploded view of the mounting means for the scrub brushes.

Fig. 15 is a side, elevational view of one of the scrub brush assemblies.

Fig. 16 is an oblique, side, elevational view of one of the brush support plates.

Fig. 17 is an oblique, side elevational view of one of the brush drive plates.

Fig. 18 is an oblique, side elevational view of a brush support plate turned upside down.

Fig. 19 is a side, elevational, fragmentary view of a portion of the brush support showing a part of the drive plate in phantom.

Fig. 20 is a fragmentary, plan view of the brush support showing in phantom a part of the drive plate in place.

Referring to Figs. 3 and 4 of the drawings, my improved machine generally comprises a frame 10 supported by the driving wheels 14 and caster wheel 16. The frame supports the scrubbing brush assemblies 80 driven by a single prime mover 20 comprising an electric motor or gasoline engine. The motor 20 also drives the wheels 14.

The frame also supports two individual tanks 115 and 116 (Fig. 1). The tanks can be one unit separated into two tank portions by a water tight baffle. The tank 115 is a vacuum cleaner tank which collects the dirty water emulsion picked up by the squeegee mechanism 120. The tank 116 contains clean water that supplies the cleaning solution and rinse water. The driving mechanism and tanks are covered by a cover or cowling 117 which has an apron 118 at the bottom.

The upper frame member 11 supports a squeegee mechanism 120 located rearwardly of the driving wheels. This mechanism serves the dual purpose of collecting the dirty water emulsion formed by the scrubbing action, and also serves to wipe the floor clean.

For the purpose of describing this invention, it is convenient to divide the machine into various structural and operative features. These aspects of the machine will now be described.

Frame and main drive

The frame and main drive are best illustrated by Figs. 3, 4, 5 and 6. Reference numeral 10 generally designates the frame which is of longitudinal extent and includes the rear upper frame member 11 and the front lower frame member 12. The two frame members are arranged horizontally and are vertically spaced one from the other.

They are connected together at their front ends by the arcuate frame braces 13 extending forwardly, curved downwardly and attached to both front ends of the two frames. The frame member 11 is supported by the driving wheels 14, the frame member 12 by the front swivel caster 16. The driving wheels are mounted to the wheel support braces or brackets 15 secured to the upper frame 11. The front swivel caster is pivotally mounted in the wheel bracket assembly 17.

This construction of the upper frame member 11 and the lower frame member 12 facilitates the support of a single prime mover for both the wheels 14 and the scrub brush assemblies 80. The motor 20 is supported on a cross beam 21 extending transversely of the frame member 11. A drive shaft 22 extending rearwardly from the motor is journaled in the journal box 23. The shaft 22 has two pulleys 24 and 25. The pulley 24 is mounted on shaft 22 immediately rearwardly of the motor. Pulley 25 is located on the opposite side of journal box 23. The wheels 14 are driven by the pulley 25 while the brushes 80 are driven by the pulley 24.

The mechanism for driving the wheels 14 constitutes the clutched driving shaft 27 supported by bracket 32 and coupled to the pulley 25 through the gear box 26 and belt 28. The clutch mechanism 29 on the shaft 27 is a conventional cup type clutch and therefore a detailed description is not considered necessary. It is operated by an actuator rod 30 that forces the yoke 31 between each cup in one of two axial directions (Fig. 9) to position the clutch for two different forward speeds (one fast and one slow walking). A clutch actuating mechanism 40 actuates the lever. This mechanism 40 will be described in more detail under the heading "Clutch Actuating Mechanism." It should be realized that this clutch mechanism could be utilized just as well for reversing the direction of the machine.

The wheels 14 are driven by the shaft 27 through the differential 33 by a pair of chains 34 and sprockets 18 on each side of the differential and the clutch mechanism. The differential 33 permits sharp turns and overall smoother performance of the main drive.

Clutch actuating mechanism

Figs. 9, 10, 11 and 12 illustrate the clutch actuating mechanism 40 for actuating the clutch rod 30 which in turn positions the yoke 31 in the proper slow or high speed clutch position. The rod 30 is seated in the slot 41 of the lever 42 and actuated by rotating lever 42 in a direction on either side of neutral plane A (Fig. 11). The lever 42 is pivotally mounted on a stud 43 supported by the bracket 44 secured to the frame member 11 (Fig. 13). An integral post 45 extends from the hub of the lever 42. A somewhat L-shaped actuator control arm 46 is rotatably mounted on this post. It is prevented from accidentally being pivoted due to vibration or otherwise by a resilient plunger 47 extending through the hub of arm 46 and bearing against the post 45. The control arm 46 is permitted to be rotated to either of two positions on each side of neutral A by exerting a positive rotative force on the arm.

It is an important feature as illustrated by Fig. 11 that the arm can be easily rotated from one side to the other of neutral plane A passing through the axis of rotation O and the neutral position. Rotating the arm from one side of the plane A to the other permits actuation of lever 42 to either of two positions on each side of neutral by the same force F applied to the linkage rod 48. The rod 48 is actuated by a hand lever 49 or any other suitable type lever which always applies the same force to rod 48. As illustrated by the drawings the post 45 is preferably inclined at an angle to the plane A in order to provide a greater moment arm for rotating the lever 42.

The clutch actuating mechanism is easily operated and particularly adapted for machines of this type in which the actuation of a clutch is required to be accomplished by a single force applied in the same direction. To actuate the clutch in one direction the control arm 46 is first rotated to the position on the left side of plane A as shown in full line (Figs. 10 and 11). Then application of force F to the rod 48 rotates lever 42 in a counterclockwise position as illustrated by the dotted lines. The clutch is moved to the other position by first rotating arm 46 to a position on the right side of plane A as shown by Fig. 11. Applying force F then causes the lever to be moved in a clockwise direction.

From this description of the clutch actuating mechanism it should be evident that the operator can operate the clutch of the machine by applying the same force to the hand lever 49. The direction of the drive is determined by simply rotating the arm 46 to either side of plane A and then applying the same force to the lever 49. This feature is particularly important to scrubbers of this type which are preferably controlled by a hand lever.

Scrubbing mechanism

The scrubbing brush assemblies 80 are also driven by the single motor 20. The drive is taken off the pulley 24 mounted on the shaft 22 immediately adjacent the motor 20.

The brushes 80 and the drive mechanism for the brushes are supported on the front lower frame 12 by a cross beam or anchor bracket 35. The frame 12 is U-shaped having its open end at the rear (Fig. 4) to which the cross beam 35 is attached by any suitable means such as bolts, welding or otherwise.

Fig. 14 best illustrates this cross beam and the means for mounting the driving mechanism and brushes on it. The beam is secured to the U-shaped frame 12 by a pair of upwardly extending flanges 36 through which bolts extend for securing it to the frame 12. The beam has a jutting portion 37 extending rearwardly of the front frame and jutting portion 38 extending forwardly thereof. Journal or pillow blocks 39 are mounted on each portion 37 and 38.

The journal boxes 39 each rotatably support rigid shafts 50a and 50b. Shaft 50a has a pulley 51 on its forward end. Shaft 50b extends rearwardly on the journal box and supports a pulley 52 at that end. The two pulleys 51 and 52 are arranged so as to lie on one vertical plane. This permits a single pair of belts to simultaneously drive each of the pulleys and shafts. As viewed from above (Fig. 5), two V-shaped belts 53 are provided engaging the pulleys 51, 52 and the drive pulley 24.

The beam 35 also supports two pairs of anchor brackets 54 on which the brush assemblies 80 are pivotally mounted. Brackets 54 are each comprised of an L-shaped base 55 and an upstanding support member 56. The bases 55 are secured to the beam 35 by bolts or otherwise.

The two brush assemblies 80 are identical. They each comprise a brush gear case 81 rigidly secured in an inverted U-shaped housing 82. The brush gear case 81 houses pinion and worm gears (not shown) in a conventional manner. The gears are accessible from the top by the removable top plate 83. The worm gear is the driving gear and the pinion gear is the driven gear to which the brush is attached. The worm is driven by the flexible shaft 84 coupled to the rigid shaft 50a or 50b. The gear case 81 is rectangular in shape and is secured at all four corners in the inverted U-shaped housing 82 by screws 85 extending through holes 86. Therefore, in normal operation the gear case is not permitted to move relative to the housing 82.

The entire brush assemblies 80 are pivotally mounted on the brackets 56 of cross beam 35 by the links or arms 57. The arrangement of these arms is an important feature of this invention. Basically, the arms are attached to the brackets 46 and the housing 82 in a pantographic arrangement. A pantographic arrangement is an arrangement of the links or arms in groups of at least two spaced one above the other in parallelogram form. This arrangement prevents the housing from pivoting independently of the arms. It also requires the housings to move squarely in a direction parallel to the anchor brackets 46 or the vertical axis of the machine.

A preferred arrangement is illustrated by Fig. 14 in which a pair of arms or links 57 are secured by pins 58 at one end to the anchor bracket 56. At the other end they are secured by pins 59 to the side of the inverted U-shaped housings 82. A pair of arms is located on each side of the housing. Each arm of each pair is parallel to each other at all times. The lines through pins 56 and 57 are also always parallel. Thus, a parallelogram is always described by these lines and arms 57.

The pantographic arm arrangement makes the downward direction of movement of the housing 82 always parallel to the anchor bracket 46. As a result, the direction of the force applied on the brush is parallel to the bracket 46. Thus, the direction of the brush force is always determined by the longitudinal attitude of the machine. For example, when the machine is tipped upwardly as it moves up an incline, the brush force also changes and it is perpendicular to such incline making the brushes parallel to the floor at all times.

The arms or links 57 permit the brushes to move upwardly when they encounter surface irregularities. However, the direction of the brush force constantly remains perpendicular to the floor surface even during pivotal movement upwardly or downwardly. Thus, as the brushes ride over a hump in the floor they continue to exert a positive scrubbing force on the hump and the area surrounding it. In conventional scrubbers of this type the brushes tip as they engage the floor irregularities. As a result, the brushing force is not applied squarely to the floor resulting in sections of the floor on or adjacent the irregularities being missed.

Brush pressure mechanism

The brush pressure mechanism illustrated by Figs. 7, 8, and 14 generally comprises a beam 60 having offset ends 61 and 62 to which the overlapping brush assemblies 80 are pivotally attached. This pivotal attachment includes the spaced integral ears 87 on the top of the housings between which the beam 60 is pivotally secured by pins 88. The beam 60 is either lifted or forced downwardly by a lift arm 65 coupled to the beam by lift bracket 66. The beam 60 is pivotally mounted at its center between the lower forked end 67 of the bracket 66. The upper end 68 of bracket 66 is flat and has a transverse pin 69 received by the slotted bifurcated end 64 of the lift arm 65. The lift arm 65 is rotated in a downward or upward direction by shaft 70 which in turn is rotated by a crank 71 at one end. The shaft 70 is pivotally mounted to frame 10 by the bracket 63.

As illustrated by Fig. 7 the crank 71 is actuated by a hand lever operatively connected to the crank by a pressure controlled link assembly generally denoted as 72. The pressure control assembly includes a connector 73 connecting one end to the crank 71 and another connector 74 attaching the other end to hand lever 72. Rods 75 and 76 are respectively secured to each connector. Rod 75 has a plunger 78 on its end slidable in the tube 77. Rod 76 is secured to the end of the tube 77. A spring 79 in tube 77 bears against plunger 78 biasing the rods to extended position.

The operation of the pressure mechanism is relatively simple. The operator actuates the brushes by moving the hand lever 72 to a scrub or lift position. Several scrub positions each having different pressure applications are preferred. As illustrated (Fig. 7), pulling back on lever 72 rotates crank 71 and lift arm 65 clockwise and upwardly causing the brushes to be lifted. Pushing forward on lever 72 rotates lift arm 65 counterclockwise and downwardly applies a downward force on the brushes. The force applied to lever 72 is directly applied to the brushes. With the hand lever in scrub position, the brushes are moved upwardly as they engage humps or irregular floor surfaces. Normally, in conventional scrub machines the brushes are either entirely independent or rigidly tied together. In either case sections of the floor on or adjacent the irregularities are missed. If the brushes are tied together, when one rides over an irregularity, the other brush is lifted off the adjacent floor surface. When the brushes are entirely independent, streaks are frequently left in the irregular areas of lower contour which the brushes fail to contact because of the higher ridges.

In accordance with this invention, when one brush engages a high spot, the beam 60 is pivoted causing the other brush to be pushed downwardly. This action causes greater pressure on both brushes and eliminates the usual streaks or misses generally experienced with other scrubbing machines. The dip by one brush as the other rises causes the area between the irregularity and flat surface to be positively brushed by the dipping brush.

The pressure control mechanism 72 provides a means for determining a maximum brush pressure. The compressive force of the spring 79 controls this maximum brush pressure. Therefore, regardless of the pressure applied to hand lever 72, the pressure on brushes 80 will never exceed the compressive strength of the spring. When a force greater than the desired maximum brush pressure is applied to lever 72, the plunger 78 overcomes spring 79 causing rod 75 to telescope into the tube 77. The distance rod 75 is permitted to telescope into tube 77 is sufficient to permit the brushes to move to normal lift position while the hand lever is in full down position. This structure permits adjustment of maximum pressure by varying the spring. It provides a positive pressure control without danger of linkage binding.

Removable brush support structure

Referring to Figs. 15–20, the removable brush support structure generally denoted as 90 comprises a drive plate 91 mounted on shaft 107 and a brush support plate 92 attached to the drive plate.

The drive plate 91 includes a cylindrical plate having a hub 93 of reduced diameter extending axially downwardly. A shoulder is formed by the hub 93 and the flange 94. Three equally spaced fingers 95 protrude radially outwardly from hub 93. The top face of the fingers are spaced from the flange 94 a sufficient distance to receive a portion of the brush support plate as will be described hereinafter. The bottom faces of the fingers are inclined downwardly for facilitating the easy installation of plate 92.

Plate 92 comprises two concentric rings 96 and 97 joined together by spokes or webs 98. The ring 97 is relatively thin, its thickness being approximately equal to the distance of the spacing between the top face of fingers 95 and the bottom face of flange 94. These dimensions permit ring 97 to slide between the fingers 95 and flange 94.

Ring 97 has a central opening 99 slightly larger in diameter than the hub 93 and adapted to receive the hub. Slots 100 of appropriate size and position for receiving fingers 95 project radially from the central opening. Stops 101 formed by spokes or webs 98 are positioned between each slot. A spring retaining plate 102 is located over each slot 100. This plate is to hold the fingers 95 against the stops 101. The spring has an arcuate-shaped flat platform 103 supported over the slot 100 by an integral L-shaped leg comprising the base 104 and the web 105. The base is secured to ring 97 by screws 107. The platform 103 has the offset or detent 106 formed by arcuately shaping a portion of the platform toward the ring 97. The detents bear against the fingers when they are positioned against the stops 101.

The operation of the brush support means is simple.

The brush support plate 92 is attached to drive plate 91 by first aligning opening 99 and slots 100 with hub 93 and fingers 95. Then the plate 92 is inserted over the hub until the ring portion 97 abuts flange 94. Plate 92 is rotated causing ring 97 to enter into the space between flange 94 and fingers 95. During this rotative step the fingers 95 cam against and ride on detents 106. The spring plate 102 is forced away from normal position until the fingers are seated between detents 106 and stops 101. In this position the detents hold the fingers against stops 101. This eliminates chattering between the two plates. It also prevents the brushes from accidentally falling off the unit due to back lash when the unit is stopped. As a result the brushes are held securely on the unit and the considerable chattering noise and wear and tear experienced with other scrubbing machines is substantially eliminated.

*Miscellaneous features*

The machine is self-propelling. It is operated by electricity fed to motor 20 through the electric cord 110 (Fig. 1). The cord is wound on a spring biased reel 111 and fed through the conduit wand 112 on the top of which is the roller feed assembly 113. The wand is located on the side of the machine to provide better visibility.

The squeegee mechanism 120 briefly comprises a squeegee element 121 capable of picking up water. Suitable mechanism well known in the art is provided to force the water into the waste tank 115. The squeegee element is normally biased downwardly against the floor by a spring 122. A foot pedal 123 is provided to lift it from the floor.

The frame member 12 has a plurality of bumper rollers 119 rotatably secured thereto and extending through openings in the aprons 118. These rollers prevent damage to walls and other obstructions which the machine might hit.

*Résumé*

The machine as above described provides a self-contained unit for thoroughly scrubbing or polishing floors. The machine is capable of scrubbing a floor width equal to an operative width of the machine with no streaks between the brushes regardless of the irregularities in the floor surface. The brush action is the same regardless of the slope of the floor. Areas between different floor contours are brushed thoroughly. The pressure applied by the brushes is positive and can be varied. Binding due to excessive brush pressure is eliminated.

The driving mechanism is smooth in operation. Sharp turns are capable because of the differential arrangement. Reverse operation is accomplished in a simple manner by a mechanism to which the same force is applied.

The individual mountings for the brushes are simple. Chattering and resultant wear is eliminated.

Having described my invention, it should be understood that although I have shown preferred embodiments, other modifications are possible with the principles and spirit of the invention. Therefore, such modifications are included and covered by this invention unless the claims by their language expressly state otherwise.

I claim:

1. A floor cleaning machine comprising: a frame having longitudinal extent; a pair of separate brush supports beneath said frame; separate brush means supported by each of said brush supports; a transversely disposed beam pivotally supported intermediate its ends on said frame; said brush supports each being pivotally attached to opposite ends of said beam whereby a force exerted upwardly on one of said brush means imparts a downward force on the other of said brush means; and means operatively connected to said beam for exerting an overall downward pressure on said brush means.

2. A floor cleaning machine comprising: a frame having longitudinal extent; a pair of separate brush supports beneath said frame; separate brush means supported by each of said brush supports; a crank pivotally supported by said frame about a horizontal axis; a transversely disposed beam pivotally supported intermediate its ends on one end of said crank; actuating means connected to the other end of said crank; said brush supports each being pivotally attached to opposite ends of said beam whereby a force exerted upwardly on one of said brush means imparts a downward force on the other of said brush means; and means operatively associated with said actuating means for causing said crank to be pivoted to create an overall downward pressure on said brush means.

3. The machine defined by claim 2 in which said actuating means comprises: a two piece rod; and compressible means between said rod for absorbing excessive forces exerted upwardly on said brushes.

4. A floor cleaning machine comprising: an elongated frame; a pair of separate brush supports beneath said frame; separate brush means supported by each of said brush supports; said brush means being supported for rotation about an axis substantially vertical to the longitudinal axis of said machine; support means on said frame; pantographic link means operatively connecting said support means and brush support means; means for driving said brush means; a transversely disposed beam pivotally supported intermediate its ends by said frame; said brush supports each being pivotally attached to opposite ends of said beam whereby a force exerted upwardly on one of said brush means imparts a downward force on the other of said brush means; and means operatively connected to said beam for exerting an overall downward pressure on said brush means.

5. A floor cleaning machine comprising: an elongated main frame; support brackets mounted on said frame perpendicular to the longitudinal axis of said machine; a pair of brush support housings separate from said support brackets; brush means supported by each of said support housings for rotational movement about an axis perpendicular to said longitudinal axis of said machine; a plurality of links supporting each of said housings and extending between said housings and said brackets; said links being parallel to each other and pivotally secured at one of their ends to said housings and at their other ends to said bracket; said links being arranged in pantographic fashion whereby the axis about which said brush means rotates and along which said downward pressure is exerted remains perpendicular to said longitudinal axis regardless of the lengthwise inclination of said machine or the vertical position of said brush means; a beam pivotally supported intermediate its ends by said frame; said brush support housings each being pivotally attached to opposite ends of said beam whereby a force exerted upwardly on one of said brush means imparts a downward force on the other of said brush means; and means operatively connected to said beam for exerting an overall downward pressure on said brush means.

6. A floor scrubbing machine comprising: a rear upper frame; a lower front frame; said frames overlapping each other and connected together by frame braces; driving wheels rotatably mounted on said rear frame; a single prime mover secured to one of said frames between the overlapping portions thereof; a shaft extending rearwardly from said prime mover; a gear train mounted on said rear frame and operatively connected to said shaft from said prime mover and to said wheels for driving the same; a cross beam running transversely of said lower frame beneath said prime mover; a pair of journal boxes supported by said cross beam; a rigid shaft rotatably mounted in each of said journal boxes; a pair of brush assemblies; flexible shafts secured to each of said rigid shafts and to said brush assemblies; support means on said cross beam; pantographic link means connected to said support means and to said brush assemblies; and means for moving said brush assemblies in a vertical direction.

References Cited in the file of this patent

UNITED STATES PATENTS

| | | |
|---|---|---|
| 901,154 | Crozier | Oct. 13, 1908 |
| 1,830,362 | Johnson | Nov. 3, 1931 |
| 1,901,647 | Howald | Mar. 14, 1933 |
| 1,979,797 | Finnell | Nov. 6, 1934 |
| 2,177,052 | Blough | Oct. 24, 1939 |
| 2,248,699 | Finnell | July 8, 1941 |
| 2,317,843 | Backlund | Apr. 27, 1943 |
| 2,524,995 | Sassano | Oct. 10, 1950 |
| 2,527,805 | Foley et al. | Oct. 31, 1950 |
| 2,683,885 | Johnson | July 20, 1954 |
| 2,732,573 | Hyland | Jan. 31, 1956 |

FOREIGN PATENTS

| | | |
|---|---|---|
| 346,484 | Great Britain | Apr. 16, 1931 |
| 651,826 | Great Britain | Apr. 11, 1951 |